Sept. 17, 1968          F. M. MINKS          3,402,325
ALTERNATOR HAVING OVERVOLTAGE PROTECTION MEANS CONNECTED
TO ESSENTIALLY SHORT CIRCUIT THE ALTERNATOR
Filed Feb. 21, 1966
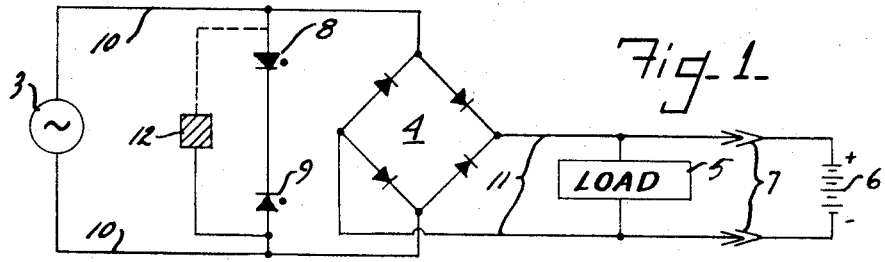
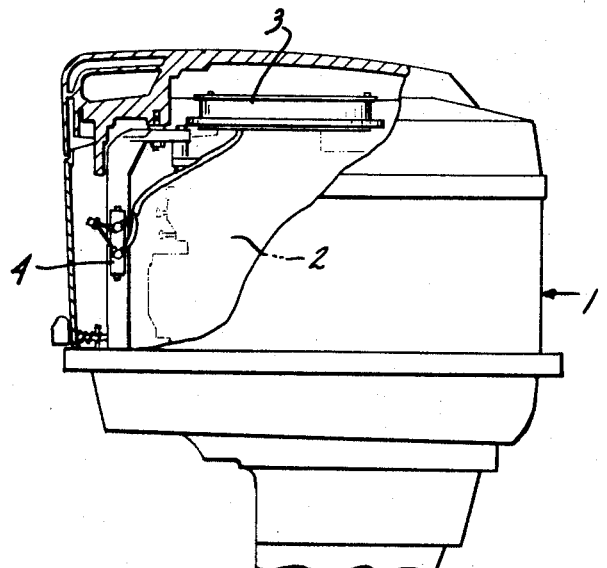
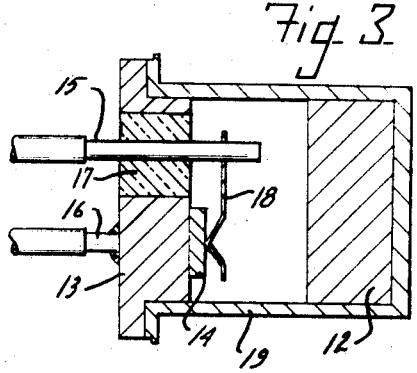
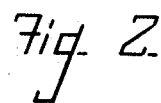
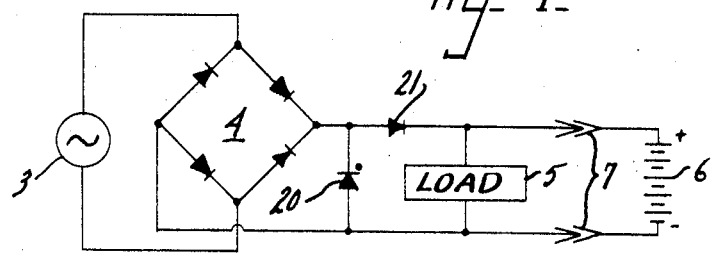
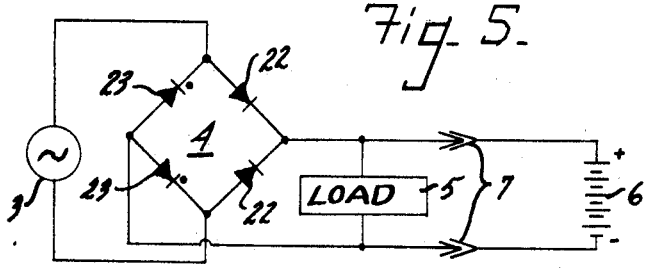
INVENTOR
FLOYD M. MINKS
BY
Andrus & Starke
Attorneys United States Patent Office 3,402,325
Patented Sept. 17, 1968

3,402,325
ALTERNATOR HAVING OVERVOLTAGE PROTECTION MEANS CONNECTED TO ESSENTIALLY SHORT CIRCUIT THE ALTERNATOR
Floyd M. Minks, Campbellsport, Wis., assignor, by mesne assignments, to Brunswick Corporation, Chicago, Ill., a corporation of Delaware
Filed Feb. 21, 1966, Ser. No. 528,871
12 Claims. (Cl. 317—16)

ABSTRACT OF THE DISCLOSURE

A Zener diode is connected across an alternator to function as an overvoltage protective device. The alternator is connected to charge a battery. Connected across the Zener diode is a junction which will be fused upon conduction of the Zener diode. The Zener diode is normally non-conducting but upon open circuit conditions will break down and conduct thus fusing the junction connected across the Zener diode. The fusing of the diode junction enables the carrying of the short circuit alternating current.

---

This invention relates to a direct current power supply system for internal-combustion engines and the like and particularly to an outboard motor.

Generally, the power for operating the ignition system and the like of an outboard motor may be supplied from a battery and an alternator having a full wave rectifier connected to the output to provide a direct current source. The battery and the alternator are connected in parallel to the ignition system. If the motor is operated with the battery disconnected from the load circuit, certain alternators, particularly unregulated permanent magnet types, generate exceptionally high voltages across the load terminals. Thus, the battery is charged from the alternator and forms a voltage limiting load means. The high voltages may not only present a hazard to the operator but may damage the operating components, particularly if a solid state ignition system is employed. Further, where solid state components are in the load circuit, the usual current actuated fuses do not respond quickly enough to protect the load circuit components. In past practice, the systems have been constructed without protective means, reliance being placed on warning against operation without the battery connected.

The present invention is particularly directed to a reliable and simple overvoltage protective device to reduce the voltage under such conditions by establishing and maintaining an essential short circuit across the alternator.

Generally, in accordance with the present invention, a voltage sensitive means is connected across the alternator to function as an overvoltage protective device. The voltage sensitive means has the characteristic of maintaining an essentially open circuit condition to voltage in excess of the normal operating voltages and thereafter rapidly establishing an essentially short circuit condition once the voltage exceeds such operating voltages. A particularly satisfactory device having the necessary response time has been found to be a Zener type diode. The diode means is connected across the alternator and constructed to carry the short circuit current of the alternator.

Under all operating conditions having the battery connections maintained intact, the Zener diode means is effectively not in the circuit. However, when the battery connection is removed, the alternator voltage increases substantially above the Zener voltage of the diode means and causes fusing of the junction with a resulting bypass circuit condition.

The Zener diode means may include one or more Zener diodes which break down under open battery circuit conditions but have sufficient current carrying capacity to prevent opening of the circuit therethrough.

In accordance with one feature of the invention, a relatively small Zener diode is housed within a suitable enclosure or cap. The diode is essentially nonconducting as long as the battery circuit is maintained. If the voltage increases to an abnormal level as a result of an open battery connection or the like, the diode junction fuses to a state capable of carrying the short circuit alternating current only for a short period until high temperature is reached as a result of that current. At the high temperature and the small size of the junction, the temperature produced is high enough that the short circuit currents cannot be reliably carried for an indefinite period. In accordance with the present invention, the cap is extended to provide a substantial spacing between the outer end of the cap and the diode structure proper. The outer end of the cap is filled with a suitable alloy adapted to melt at a predetermined temperature. If for any reason the Zener diode should conduct and cause a short circuit, the increased current will cause the outer portion of the cap and the alloy therein to reach a temperature which melts the alloy and causes it to move downwardly into the lower portion of the cap before temperatures are reached which can produce an open circuit. This creates a direct short across the Zener diode. The alloy has a relatively heavy current capacity and maintains the short circuit condition indefinitely.

The Zener diode can be placed directly across the alternator using a double anode Zener in order to accommodate the opposite half cycles. Alternatively, the Zener can be placed directly across the direct current leads with a diode inserted between the Zener diode connection and the battery to prevent discharge of the battery if reconnected after the Zener was shorted.

A piar of Zener diodes may also be placed in a bridge rectifying circuit across the alternator. The Zener diodes in this case would be selected to have a fused junction current carrying capacity in excess of the short circuit alternator current.

The present invention thus provides a very simple and reliable means to prevent establishment of dangerous alternator voltages.

The drawings furnished herewith illustrate preferred embodiments of the present invention in which the above advantages and features as well as others will be clear from the following description.

In the drawings:

FIG. 1 is a schematic circuit diagram incorporating the subject matter of the present invention;

FIG. 2 is a diagrammatic view of an outboard motor showing the mounting of a protective Zener diode constructed in accordance with the present invention;

FIG. 3 is a cross sectional view of the Zener diode shown in FIG. 2;

FIG. 4 is a schematic circuit diagram similar to FIG. 1 showing an alternative construction and placement of the protective diode within the present invention; and FIG. 5 is a view of a further embodiment within the broadest aspect of the present invention.

Referring to the drawings and particularly to FIGS. 1 and 2, the present invention is shown in connection with an outboard motor 1 which includes an internal-combustion engine 2. An alternator 3 is driven by the engine 2. The alternator 3 is connected to a full wave diode bridge circuit 4 to produce a D.C. output across the diode bridge circuit 4 suitable for operating the electrical system of the engine including an ignition circuit and the like and shown in the drawing by a block 5 appropriately labeled the electrical load and also for charging of a battery 6 which provides starting energy as well as running energy if the alternator 3 is inoperative. As shown, the bridge circuit 4 and battery 6 are connected in parallel to load 5 with similar polarities such that either may energize the load 5 and the generator will charge the battery 6. Suitable jack or plug type connectors 7 are shown in the battery leads.

In accordance with the present invention, a pair of similar Zener diodes 8 and 9 are connected across the output leads 10 of the alternator 3. The diodes 8 and 9 are connected in back-to-back relation to maintain an essentially open circuit condition with respect to the alternator output leads 10 and therefore the bridge circuit 4 which is connected to the load leads 11.

In accordance with the present invention, a conductive material 12 is adapted to be connected across and in parallel with the Zener diodes 8 and 9 as shown by the phantom leads. As more fully developed hereinafter, the conductive material 12 is normally a solid and is disconnected from the connections to the Zener diodes 8 and 9. Material 12 is mounted in heat exchange relation to diodes 8 and 9 and at a predetermined abnormal current melts to establish a connection directly across the diodes. Generally, during normal operation of the circuit, the material 12 is not connected across Zener diodes 8 and 9.

When the output voltage of the alternator 3 rises as a result of opening a battery lead 7 or the like, the one diode 8 conducts during one half cycle and the opposite diode 9 conducts during the opposite half cycle. The output of the alternator 3 increases to a voltage substantially in excess of the Zener voltages of diodes 8 and 9 and causes destruction and fusing of the junctions of the respective diodes. The current through the diodes rapidly increases the junction temperature to a level tending to burn out the diodes and create and open circuit through the Zener diode circuit; with a resulting high voltage created across the leads 10 and therefore across leads 11. However, in accordance with the present invention, the material 12 is mounted in closely spaced relationship to the diodes 8 and 9. Under normal conditions, the material 12 remains a solid and spaced from the circuit conditions. However, the rapid increase in heat associated with a complete breakdown and fusing of the junction of the Zener diodes causes the material 12 to melt and short circuit across the diodes before the open circuit condition is created. This provides a high current capacity bypass circuit path between the leads 10.

Referring particularly to FIGS. 2 and 3, the Zener diodes 8 and 9 are shown as a part of a unitary double anode unit modified in accordance with the concepts of this invention to provide a highly operable device for the present invention.

Generally, as shown in FIG. 3, the diode unit includes a base 13 to which a silicon wafer 14 of the double anode variety is mounted. A pair of leads 15 and 16 is provided. The one lead 15 is aligned with the wafer 14 and connected to the base 13 to form the one lead connection to one side of the wafer 14 through the base. The opposite lead 16 extends through a glass lead 17 secured within an opening in the base 13 in spaced relation to wafer 14. A relatively heavy conducting strap 18 interconnects the opposite or exposed connection of the wafer 14 to the second lead 17. An outer cap 19 is secured to the outer edge of the base 13 enclosing the wafer 14 and the lead connections to strap 18. The cap 19 projects outwardly from the wafer a substantial distance. Material 12 is a suitable alloy mass and fills the outer half of the cap 19 and is thus normally substantially spaced from the wafer and the wafer lead connections and thus forms the terminals of the internal Zener diodes 8 and 9 as shown in FIG. 1. The material 12 is in good thermal connection to the cap 19 and thus to the wafer 14.

The diode unit, as shown in FIG. 2, is mounted within the motor 1 with cap 19 in a horizontal plane with the base 13 and outer end of cap 19 horizontally spaced.

If for any reason the Zener diodes 8 and 9 break down completely and short circuit the alternator, the relatively high current flow results in a corresponding increase in the temperature of the unit and particularly the cap 19. As a result of the high temperature, alloy mass 12 is reduced to a flowing state and as a result flows by gravity to the lower portion of the cap 19. The melted mass 12 bridges the gap between the cap and wafer and particularly the connection of the strap 18 and consequently provides a direct path therebetween which is capable of carrying a relatively heavy current. As a result, the current is carried by the melted alloy mass 12 which solidifies after establishing the bypass path and maintains the circuit connection between the alternator leads 10 with a resulting reduction of the output voltage at leads 11 essentially zero. The engine will therefore stop operating. However, the battery connection can again be made and the engine operated from the battery.

Referring particularly to FIG. 4, a protective circuit is shown wherein a single Zener diode 20 is connected directly across the output of the rectifying circuit. Corresponding elements in FIGS. 1 and 4 are similarly numbered and identified for simplicity and clarity of explanation.

In FIG. 4, the single Zener diode 20 is connected directly across the direct current load leads 11 to the load 5. It will function in precisely the same manner as either one of the Zeners shown in FIG. 1. However, as FIG. 3 has the Zener diode 20 connected across the D.C. terminals or lines 11, a single diode only is required. In order to prevent discharging of the battery through the Zener diode 20, a blocking diode 21 is connected between the Zener diode and the load. The diode 21 is polarized to conduct the alternator current and to block the battery current. The diode 21 in essence isolates the two voltage sources while permitting load current flow from both voltage sources.

In all other respects, the Zener diode can be constructed similar to that shown in FIGS. 2 and 3 and operates in the same manner as that described with respect to the first embodiment.

In both instances, the safety or voltage limiting circuit may employ a high meltable alloy to short out the junction rather than requiring the Zener diode to have a fused junction current carrying capacity equal to the alternator output. Thus a much smaller junction may be used.

However, Zener diodes are commercially available which will carry the short circuit currents of an alternator such as used in outboard motors and the like. Such diodes may be advantageously employed as a part of the bridge circuit to perform the dual functions of rectification and over-voltage protection. In FIG. 4, the alternator 3 is connected in circuit through a diode bridge circuit 4 constructed in accordance with this invention. In FIG. 4, however, two adjacent legs of opposite conducting paths are conventional diodes 22 while the other two adjacent legs connected between the opposite alternator leads 10 and the one direct current bridge terminal are special Zener diodes 23 having a fused junction current carrying capacity at least as great as the alternator output with the fused diode junctions connected across the alternator. Under normal operating conditions, the Zener diodes 23 function as conventional diodes; carrying one half cycle of the output and blocking the opposite half cycle. Thus, they do not operate in the Zener range. If an open circuit condition is established and the alternator output is such as to cause disruption of the Zener diodes 23, a short circuit condition is established across the alternator 3 directly by the disrupted Zener diodes. By proper selection of the Zener diodes 23, the disrupted diodes will continue to carry the short circuit current through the fused junctions for an indefinite period. For example, suitable Zener diodes for a 12 volt system for outboard motors and the like with an alternator output of approximately 15 amps may employ 30 volt 10 watt Zener diodes.

The present invention thus provides a simple and inexpensive means for protecting against formation of dangerous voltage conditions from an alternator-rectifier assembly such as widely employed in outboard motors and the like.

Various modes of carrying out the invention are contemplated as being within the scope of the following claims particularly pointing out and distinctly claiming the subject matter which is regarded as the invention.

I claim:
1. In a direct current power supply,
an alternator having a selected open circuit voltage,
a load circuit means including limit means to limit the output voltage of the alternator,
a circuit connected between the alternator and the load circuit means and including a voltage sensitive means maintaining an essentially open circuit condition to a voltage in excess of normal operating voltages and thereafter establishing an essentially short circuit operating condition to the alternator, said voltage sensitive means being connected as an overvoltage protective device in the circuit and being subjected to the output voltage of the alternator.

2. In a direct current power supply,
an alternator having a selected open circuit voltage,
a load circuit means including limit means to limit the output voltage of the alternator,
a circuit connected between the alternator and the load circuit means and including Zener type diode means connected therein as an overvoltage protective device, said Zener diode means being subject to fusing the junction in response to removal of the limit means and forming a low resistance current path adapted to carry the alternator short circuit currents for a substantial period to protect the load circuit means from over-voltage caused by failure or disconnection of the limit means.

3. The power supply of claim 2 wherein said Zener type diode means includes a Zener diode having a fused junction current carrying capacity in excess of the short circuit current of the alternator.

4. The power supply of claim 2 wherein said diode means includes a diode element mounted within an enclosure and having a pair of circuit connecting leads, and a meltable conducting material within the enclosure in spaced relation to the leads and being melted by the heat generated by current through the diode element after fusion of the diode junction to bridge the space between said leads.

5. The power supply of claim 2 wherein said diode means includes a diode element mounted within a metallic enclosure which forms one connection to the diode element, said diode element having a second connection spaced from the enclosure, and a meltable material disposed within the enclosure in spaced relation to the element, said material being melted by short circuit current through the element and bridging the space between the second connection and the enclosure to establish a short circuit path between the first and second connections.

6. The direct current supply of claim 2 wherein said circuit includes a diode bridge including Zener diodes in the legs connected to a direct current terminal, said Zener diodes having a fused junction current carrying capacity in excess of the short circuit current of the alternator.

7. In a power supply for internal-combustion engines and the like including an alternator connected through a circuit having means to rectify the alternator output to the semiconductor ignition system of the engine in parallel with a battery, comprising
a voltage sensitive diode means connected in the circuit across the alternator, said diode means maintaining an essentially open circuit condition to a voltage in excess of the operating voltage with said battery circuit completed and having the junction thereof fused in response to the alternator voltage established with the battery disconnected.

8. The power supply of claim 7 having a meltable material in heat exchange relation to said diode means and arranged to bridge the connection to the diode means when melted, said material being melted by the heat generated by current through the fused junction of the diode means.

9. The power supply of claim 7 wherein the diode means includes a base having the terminals secured thereto and an outer metallic cap, and a meltable material disposed within an outer portion of said cap and, upon melting, filling the bottom portion of the enclosure and bridging the connection to the diode means.

10. The power supply of claim 7 wherein the diode means includes a metallic base having a Zener diode element secured thereto with the base forming a terminal and having a second terminal mounted in the base and connected to the opposite face of the element, an outer metallic cap secured to the base, a meltable material disposed within the outer portion of the cap and upon melting filling the lower portion of the cap and bridging the gap between the cap and the opposite face of the element.

11. The power supply of claim 7 wherein said means to rectify the alternator output includes a full wave diode bridge and said diode means includes a pair of Zener diodes connected between one direct current terminal and the opposite sides of the alternator to form oppositely active legs of the diode bridge, said diodes being selected to short circuit and fuse the diode junctions in response to opening of the load on the alternator, said fused junction having a current carrying capacity at least as great as the alternator output.

12. The power supply of claim 7 wherein the means to rectify the alternator output includes a rectifying circuit and said diode means is connected across the output of the rectifying means and diode means are connected in series between the ignition system and the rectifying circuit.

References Cited

UNITED STATES PATENTS

| | | | |
|---|---|---|---|
| 2,157,886 | 5/1939 | Cuttino | 317—16 X |
| 3,187,224 | 6/1965 | Le Massena | 317—16 |
| 3,296,518 | 1/1967 | Stumpe | 317—40 X |
| 3,305,849 | 2/1967 | Bienhoff | 317—16 X |
| 3,312,889 | 4/1967 | Gold | 317—16 X |

LEE T. HIX, *Primary Examiner.*

R. V. LUPO, *Assistant Examiner.*